United States Patent

Epstein et al.

[15] 3,660,888
[45] May 9, 1972

[54] PROCESS FOR MAKING ELECTRICAL ENERGY SOURCES

[72] Inventors: Sheldon L. Epstein, Wilmette, Ill.; Bernard W. Wessling, Winthrop, Mass.

[73] Assignee: Brunswick Corporation, Chicago, Ill.

[22] Filed: July 24, 1969

[21] Appl. No.: 845,945

[52] U.S. Cl..............................29/471.3, 29/471.1, 117/22, 117/31
[51] Int. Cl.......................................B23k 31/02
[58] Field of Search ..............29/471.1, 470, 471.3, 419; 117/22, 31

[56] References Cited

UNITED STATES PATENTS

| | | | |
|---|---|---|---|
| 2,567,186 | 9/1951 | Cross et al. | 117/31 |
| 2,616,165 | 11/1952 | Brennan | 29/419 UX |
| 2,681,375 | 6/1954 | Vogt | 117/22 X |
| 3,101,274 | 8/1963 | Beyerstedt et al. | 117/22 X |
| 3,254,189 | 5/1966 | Evanicsko et al. | 29/419 UX |
| 3,255,280 | 6/1966 | Burrowes | 29/419 UX |
| 3,400,448 | 9/1968 | Helda et al. | 29/471.1 |

Primary Examiner—John F. Campbell
Assistant Examiner—Richard Bernard Lazarus
Attorney—Donald S. Olexa, Jerome M. Teplitz and John G. Heimovics

[57] ABSTRACT

The specification describes a molten carbonate fuel cell electric energy source incorporating a novel pair of electrodes comprising a pair of permeable thin metallic films painted on a magnesia electrolyte matrix and a plurality of fiber metal wicks flocked onto the films. During operation, the molten carbonate electrolyte permeates the wicks, which extend into the gas manifolds, to provide very large surface areas for three-phase fuel cell reactions covered by thin films of electrolyte supplied by large reservoirs in the wicks to minimize cell overvoltage. In addition to the preferred embodiment, a process for fabricating fuel cells and electrochemical electrodes is described. Also, applications to other types of fuel cells, batteries and electrochemical systems are described.

14 Claims, 3 Drawing Figures

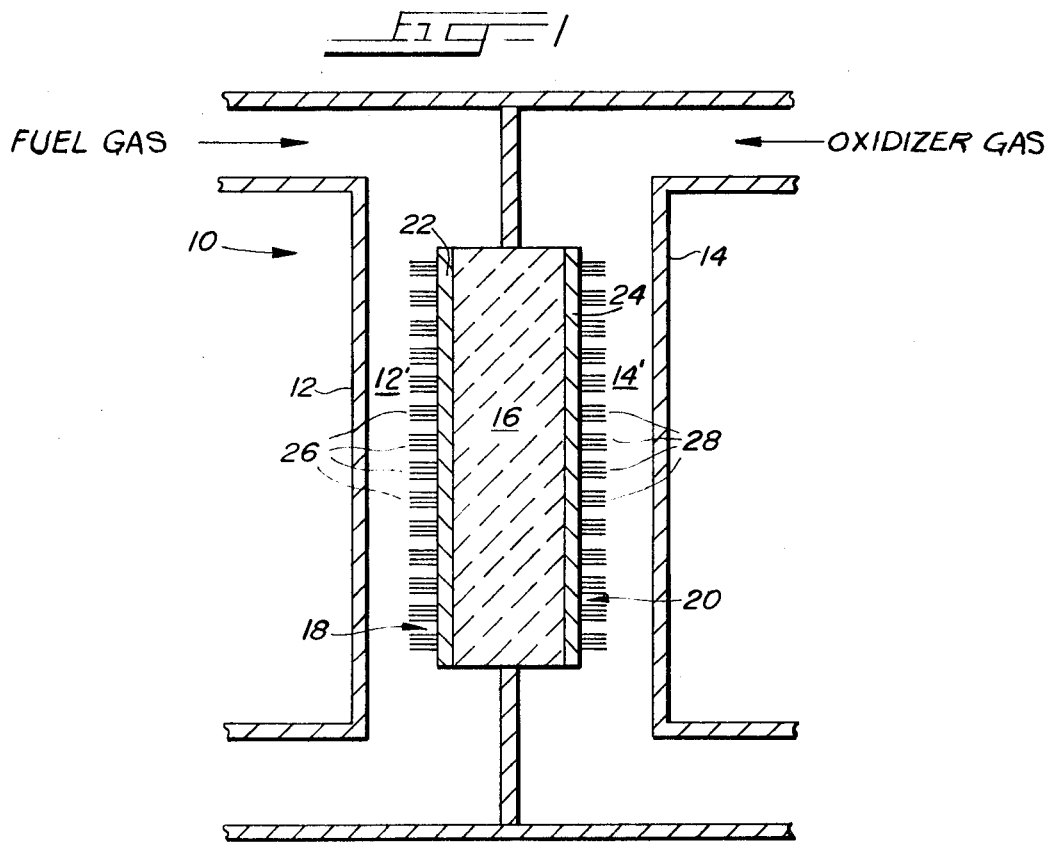
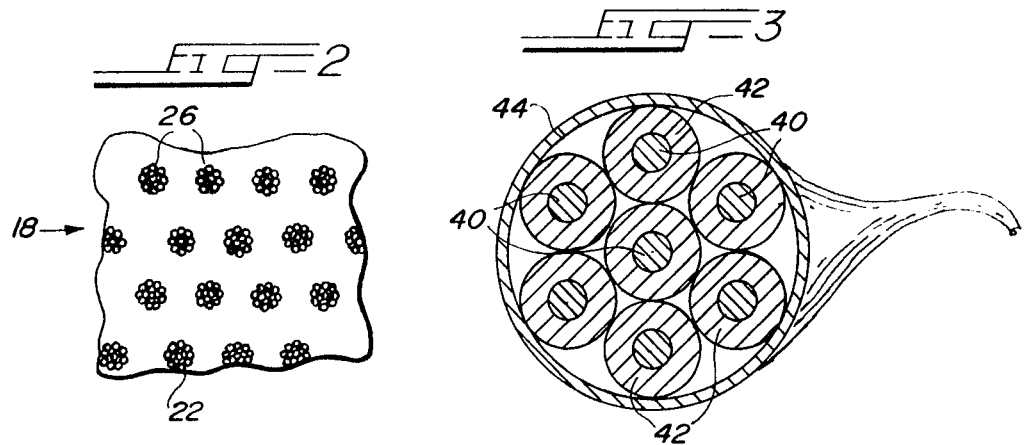
INVENTORS
SHELDON L. EPSTEIN
BERNARD W. WESSLING

PROCESS FOR MAKING ELECTRICAL ENERGY SOURCES

1. Field of Invention

This invention is in the field of electric energy sources and, more particularly, in the area of fuel cells, batteries and similar electrochemical systems.

2. Description of the Prior Art

The prior art of electric energy sources such as fuel cells is well described in several references. Three which are especially noteworthy are:

Liebhafsky & Cairns, *Fuel Cells and Fuel Batteries*, Wiley, 1968.

Baker, *Hydrocarbon Fuel Cell Technology*, Academic Press, 1965.

Hart & Womack, Fuel Cells: *Theory and Application*, Chapman & Hall, 1967.

Questions about the problems and progress of prior systems are answered there and in the references cited by the authors.

As described by Liebhafsky & Cairns in Chapter 4 of their book, the overvoltage of a fuel cell (the difference between the theoretical and measured voltages) is the sum of the overvoltages or energy losses of each of the elements and interfaces between elements in a fuel cell. The description of the characteristics of the 47 components of cell overvoltage identified in Liebhafsky & Cairns' Figure 4.6–2 will be left to their text. The salient point to note is that present research indicates that the performance of present fuel cells is limited because of overvoltages associated with the electrodes.

The electrodes are the sites of three-phase reactions (gas-electrolyte-metal) where gas and electrolyte meet to form ions and generate or receive electrons passing through the external electric load. In order to increase the power output of a fuel cell system, either the reaction mechanism at the electrode must be improved to lower electrode overvoltages or the active surface area of the electrode must be raised to increase the total electrode current at a given overvoltage.

For the last several years fuel cell designers have concentrated on increasing the active surface area of electrodes by resorting to metal powder and metal fiber electrodes having smaller and smaller particle and fiber diameters. As the diameters are decreased, the number of particles and fibers in a given volume increases and therefore the total surface area increases.

There are limits, however, on how small particle and fiber diameters can become before electrode costs and fabrication difficulties escalate. Further, performance tradeoffs can be reached in powdered metal electrodes as the resistance of the electrode to the flow of electrolyte and gas increases with both age and decreasing pore size. For molten carbonate systems, these problems are summarized by Liebhafsky & Cairns in Chapter 12 of their book and by Broers, et al. at pp. 225–50 of the Baker reference where electrode sintering at 700° C. is described.

In a typical prior-art, molten carbonate system, another limitation is observed. There, an electrode comprises a porous mat of powdered (10 micron diameter) or fiber (50 micron diameters) metals flooded with molten carbonate; generally an eutectic mixture of $(Li,Na,K)_2CO_3$. gas While the electrode may be only a fraction of a millimeter thick, the gas will diffuse to a depth of only a few microns in the electrode, thereby contributing a significant component to the total cell overvoltage, because only a thin portion of the electrode is entering into the three-phase cell reaction. Increasing the gas pressure only serves to push the electrolyte from the electrode unless a sealed system is used and this is not a good technical or economic alternative.

Therefore, what is needed is an electrode which has a high active surface area to maximize the total electrode current and a thin electrolyte diffusion layer which facilitates the gas reaching active metal reaction sites to thereby lower the electrode overvoltage. The electrodes of this invention meet these requirements.

DESCRIPTION OF A PREFERRED EMBODIMENT

The fuel cell electrodes of this invention are characterized by a high surface area of metal fiber wicks which support thin electrolyte layers through which gas can readily diffuse to reach the electrode surfaces. One embodiment is illustrated in the drawings in which:

FIG. 1 is a sectional view of a fuel cell of this invention

FIG. 2 is a front view of an electrode of the fuel cell of FIG. 1

FIG. 3 is a sectional view of a can and tube matrix containing a fiber metal wick.

FIG. 1 illustrates a fuel cell 10 comprising a pair of manifolds 12 and 14 for gases, electrolyte 16 and two electrodes 18 and 20 interfaced between the electrolyte and the adjacent interior space 12' and 14' of the contiguous manifolds 12 and 14. A fluid fuel, such as hydrogen gas ($H_2$) or a hydrocarbon such as methane ($CH_4$), is pumped into the interior space 12' of the manifold 12 containing the fuel electrode or anode 18 while an oxidizing gas, such as air or oxygen, is pumped into the interior space 14' of the manifold 14 containing the oxidizer electrode or cathode 20. The external electric load is connected to the electrodes 18 and 20 by wires (not shown) passing through the manifolds.

In the present embodiment the electrolyte is a molten carbonate which may be an eutectic mixture of lithium, sodium and potassium carbonates and may contain a mixture of finely divided ceramic powders such as magnesium oxide. Although it is a solid at room temperatures, the electrolyte becomes molten and resembles a liquid or a paste, depending on the concentration of ceramic powders, when heated to operating temperatures of approximately 700° C. In order to contain it, the electrolyte is impregnated in a porous ceramic matrix which may be made of a material such as magnesia.

Each of the electrodes 18 and 20 comprises a layer of electrically conductive material 22 and 24 to which are secured wicks 26 and 28 of fine metal fibers extending beyond the respective layers' 22 and 24 surface into the gas manifolds. In this embodiment the layers 22 and 24 comprise electrolyte-permeable, metallic films painted on the sides of the electrolyte matrix. The wicks 26 and 28 are secured, as by sintering, to the films 22 and 24 in a direction substantially normal to the plane of the films or the electrode electrolyte interfaces.

The choice of metals (including alloys) for the electrodes depends on the gas and operating temperatures selected. For a molten carbonate system operating at 700° C. with a hydrogen or hydrocarbon fuel, such as methane, and oxygen or air, nickel is recommended as the material for the anode 18 and silver is recommended as the material for the cathode 20.

The success of the electrodes is largely dependent on the proper orientation and preparation of the wicks 26 and 28. As shown in FIG. 2 the wicks comprise a few fine metal fibers and are spaced apart from each other. The purpose of this structuring is to facilitate the flooding of each of the wicks with electrolyte while preventing the flooding of electrolytes between adjacent wicks. Since the gas will only diffuse through a few microns of electrolyte film, the diameter of the wicks should be maintained at about several times the gas diffusion distance so that most, if not all, of the surface area of the individual wick fibers is accessible to the gas as a reaction site. By making the wicks 26 and 28 as long as one-fourth inch very large electrode surfaces covered by thin electrolyte films are available as reaction sites. Thus the double effect of increasing active surface area to increase total electrode current and making more electrode surface available to the gas at a shallow diffusion distance to lower electrode overvoltage is achieved.

Further, overvoltage components caused by poor diffusion characteristics of $H_2O$ and $CO_2$ through thick electrolyte films are also reduced. Reaction products are readily transported to the electrode surface and escape into the manifolds.

This construction also obviates the need for trading off the overvoltage component caused by poor ion diffusion characteristics in thin electrolyte films against the overvoltage component cause by poor gas diffusion characteristics in thick electrolyte films. In prior art electrodes, the width of the electrolyte film had to be carefully balanced if the sum of the overvoltage components described was to be minimized. In the electrodes of this invention, no such dilemma exists because the wicks provide both thin films for good gas diffusion and high electrolyte volume to facilitate rapid movement of ions and reaction products. This latter effect is achieved because the wicks are highly porous and because the individual fibers are parallel to the flow of ions and chemical products rather than perpendicular as in prior art electrodes in which the particles or fibers constituted a substantial fluid impedance.

Because the wicks comprise micron-size metal fibers, special processes are required to manufacture the electrodes and the fuel cells. These processes also form a part of the invention.

The first step in the process of making the fuel cells of FIGS. 1 and 2 is to paint two opposing sides of electrolyte matrix 16, already flooded with electrolyte, with a metallic paint to form conducting layers or films 22 and 24. The metallic paint may comprise a mixture of fine nickel and aluminum powders suspended in a volatile organic base.

The second step is to secure the wicks 26 and 28 to the conducting layers or films 22 and 24 while the metallic paint is still wet. A process is preferred where only the end portions of each of the plurality of metal fibers forming the wicks is secured to the electrically conductive material. One such technique is flocking where the wicks or fibers are accelerated into the conducting surface by a force, such as electrostatic or electromagnetic attraction (or by pneumatic pressure) which tends to orient them in a preferred direction. Because the orientation of the wicks and the relative position of individual filaments within the wicks is important it is more convenient to partially fabricate the wicks before flocking.

In the case of the anode wicks 22, one method comprises inserting or packing nickel wire 40 of FIG. 3 into a matrix of tubes 42 of a second metal such as aluminum which are held together by a can 44 which also may be aluminum. In place of wire, particulate structures, such as fibers or powders, can be used or the matrix and its contents can be heated to liquify the contents during reducing. The can 44, its matrix 42 and its nickel contents are reduced in diameter, by drawing or extruding, until the nickel wires 40 reach micron-size diameters. During the reducing step, the matrix 42 and its contents may be heat treated to relieve stresses and to promote metallic diffusion of aluminum from the tubes of matrix 42 into the nickel wire or fiber 40, for a purpose to be described later. One of the techniques of producing fine metal filaments which can be used here is more fully described in U.S. Pat. No. 3,277,564 to Webber & Wilson.

Once the can 44 and its contents are reduced in size to the proper diameters, the can 42, which can be several feet long, is cut into a large number of segments having the desired wick length. These segments, which contain the wick, are then flocked or otherwise set on end into the wet conducting layer film 22. In this embodiment, the wicks or segments are oriented in a direction substantially normal to the layer 22's surface and extend beyond the surface. In other embodiments, skewed rather than normal orientations may be described to facilitate gas flow or reduce turbulence.

The next step in the process is to secure permanently the wicks or segments to the conducting layer 22 and to secure permanently the layer 22 to the electrolyte matrix 16. The electrolyte 16 matrix-electrode 18 composite is then raised to the sintering temperature of nickel. The volatile organic base of metallic film vaporizes, thereby stabilizing the film 22 and securing it to the sides of the matrix 16. The metal fibers 40 sinter to the film 22 with a strong mechanical and electrical connection.

The next step in the process is to remove the aluminum tubes 42 and the aluminum can 44. This is accomplished by immersing the electrode 18 in concentrated KOH which attacks aluminum (but not nickel) to release the nickel fibers which form the wicks 26. KOH also removes the aluminum in the metallic film 22 making it porous and permeable to the electrolyte.

As noted earlier, small amounts of aluminum diffuse into the nickel films 40 during the heat treating stage of the can reducing step. When KOH is used to release the nickel fibers, a Raney-nickel-like surface is created on the wick fibers. The surface of the fibers will be rough, thereby providing an increased active surface area over that attainable with smooth finished fibers.

The process for fabricating the anode 18 also may be used for fabricating the cathode 20. In place of nickel, silver may be used. The choice of the second metal for the matrix of tubes 42 and the can 44 depends on the mechanical and chemical properties of the material selected for the cathode.

The mechanical characteristics of the wicks 26 and 28 can be changed by varying the relative diameters of the wires 40 and the tubes 42 to control fiber size and separation. The spacing of individual wicks is controlled by the outer diameter of the can 44 and the flocking technique. One easy method of controlling the amount of open area between the wicks is to mix solid chunks or wire segments of the matrix or can material (i.e. aluminum) with the wick segments in the storage basket of the flocking machine. These solid chunks or wires will keep the wick segments separated during flocking and will be removed easily when the wick fibers are released from the tube matrix.

A number of other variations in the construction of electromechanical electrodes are also possible. In place of a painted metal film, conducting layers 22 and 24 may comprise random or woven webs mechanically secured to the electrolyte matrix 16. Where the use of an electrolyte matrix 16 is not desired, tightly woven layers 22 and 24 of metal fibers or finely perforated metal sheets may serves as sides of an electrolyte container, particularly in the case of aqueous electrolytes such as $H_3PO_4$. Further fibers may be flocked directly to the conducting layer without being placed in a tube matrix or cans.

These electrodes will also serve as anodes or cathodes in primary and secondary batteries and other electrochemical systems in addition to fuel cells. To build primary and secondary batteries, for example, aqueous or molten compounds, mixtures or solutions (not necessarily carbonates) may serve as the electrolyte and one or more manifolds may be sealed to contain an anode fluid (such as a molten metal) or a cathode fluid. These, as well as a number of other variations in the structure and process of manufacture of fuel cells and electrodes are possible within the spirit and scope of this invention.

Accordingly, we claim:

1. The process of making an electric energy source comprising the steps of:
   covering a portion of a surface of an electrolyte with a layer of electrically conductive material
   securing only an end portion of a plurality of metal fiber wicks in to the electrically conductive material wherein the fibers within each wick are substantially parallel and at a preselected angle to the conductive material.

2. The process of claim 1 comprising the additional step of:
   sintering the metal fibers to the layer of electrically conductive material.

3. The process of claim 1 wherein:
   the electrically conductive material is a metallic paint comprising metal powders in a volatile base.

4. The process of claim 3 wherein:
   the securing step is performed while the metallic paint is wet.

5. The process of claim 1 wherein the metal fibers are prepared by the additional steps of:
   inserting a metal into a matrix of another material reducing the diameter of the matrix and its contents cutting the matrix and its contents into a number of segments having a desired wick length.

6. The process of claim 5 comprising the additional step of:

heat treating the matrix and its contents to promote diffusion of the matrix material into the metal.

7. The process of claim 5 comprising the additional step of:

sintering the segments to the layer of electrically conductive material.

8. The process of claim 5 comprising the additional step of:

removing the matrix from each of the segments, thereby leaving wicks of fibers of the first metal secured to the electrically conductive material.

9. The process of claim 6 wherein the matrix is removed by the step of:

immersing the segments into a chemical which attacks the matrix to release the fibers of the metal to form wicks.

10. The process of claim 5 comprising the additional steps of:

mixing the wick segments with segments of another material prior to securing.

11. The process of claim 3 wherein the metallic paint comprises a mixture of powders of a metal and another material, comprising the additional step of:

immersing the dry conductive paint in a chemical which attacks and removes the other material leaving a porous film of metal.

12. The process of claim 1 wherein:

the metal fibers are secured to the electrically conductive material by the process of flocking.

13. The process of making a fuel cell comprising the steps of:

covering a portion of an electrolyte matrix, flooded with electrolyte, with a metallic paint to form a conducting film packing wire of a first metal into a matrix of a second metal reducing the diameter of the matrix and its contents cutting the matrix and its contents into a number of segments having a desired wick length flocking the segments onto the conducting film sintering the wires of the first metal to the conducting film removing the matrix from each of the segments by immersing the segments into a chemical which attacks the can and the tube matrix, thereby leaving wicks of fibers of the first metal flocked to the conducting film.

14. The process of claim 13 comprising the additional step of:

heat treating the matrix and its contents to promote metallic diffusion of the second metal into the first metal.

* * * * *